United States Patent
Kim et al.

(10) Patent No.: US 12,495,009 B2
(45) Date of Patent: Dec. 9, 2025

(54) NFV INFRASTRUCTURE SYSTEM BASED ON EXTENDED CONTAINER INFRASTRUCTURE

(71) Applicant: FOUNDATION OF SOONGSIL UNIVERSITY—INDUSTRY COOPERATION, Seoul (KR)

(72) Inventors: Young Han Kim, Seoul (KR); Jang Won Lee, Seoul (KR)

(73) Assignee: FOUNDATION OF SOONGSIL UNIVERSITY—INDUSTRY COOPERATION, Seoul (KR)

( * ) Notice: Subject to any disclaimer, the term of this patent is extended or adjusted under 35 U.S.C. 154(b) by 81 days.

(21) Appl. No.: 18/750,452

(22) Filed: Jun. 21, 2024

(65) Prior Publication Data

US 2024/0340253 A1  Oct. 10, 2024

Related U.S. Application Data

(63) Continuation of application No. PCT/KR2022/007460, filed on May 25, 2022.

(30) Foreign Application Priority Data

Dec. 24, 2021  (KR) .................. 10-2021-0187075
Feb. 17, 2022  (KR) .................. 10-2022-0020729

(51) Int. Cl.
  *G06F 15/16*  (2006.01)
  *H04L 47/20*  (2022.01)
  (Continued)

(52) U.S. Cl.
  CPC ............ *H04L 47/781* (2013.01); *H04L 47/20* (2013.01); *H04L 47/801* (2013.01)

(58) Field of Classification Search
  CPC ...... H04L 47/20; H04L 47/781; H04L 47/801
  (Continued)

(56) References Cited

U.S. PATENT DOCUMENTS 9,733,975 B2 *  8/2017  Cook .................. G06F 9/45558
9,948,493 B2 *  4/2018  Fargano ............. H04L 41/0823
(Continued)

FOREIGN PATENT DOCUMENTS

KR  10-2017-0030295 A  3/2017
KR  10-2018-0057282 A  5/2018
(Continued)

OTHER PUBLICATIONS

International Search Report of PCT/KR2022/007460, dated Mar. 24, 2023.
(Continued)

*Primary Examiner* — Moustafa M Meky

(57) ABSTRACT

An NFV infrastructure system based on a container infrastructure includes a master node configured to distribute and manage a virtual network function (VNF) which is an individual network function according to a request by an administrator; and a worker node of an extended container infrastructure structure which allocates the distributed VNF to a VM based infrastructure or a container based infrastructure, wherein a resource model between the master node and the worker node is a resource model which is the same as a resource model according to the request by the administrator.

8 Claims, 4 Drawing Sheets

(51) Int. Cl.
  *H04L 47/78* (2022.01)
  *H04L 47/80* (2022.01)
(58) Field of Classification Search
  USPC .......................................................... 709/226
  See application file for complete search history.

(56) References Cited

U.S. PATENT DOCUMENTS

| | | | | |
|---|---|---|---|---|
| 10,110,710 | B2* | 10/2018 | Cook | H04L 12/4641 |
| 10,666,516 | B2* | 5/2020 | Jayaraman | H04L 12/4641 |
| 10,673,978 | B2* | 6/2020 | Cook | H04L 12/66 |
| 10,698,569 | B2* | 6/2020 | Bugenhagen | H04L 67/025 |
| 10,719,348 | B2* | 7/2020 | Zembutsu | G06F 9/46 |
| 10,846,128 | B2* | 11/2020 | Andrianov | G06F 9/485 |
| 10,856,158 | B2 | 12/2020 | Mendoza et al. | |
| 10,880,399 | B2* | 12/2020 | Cook | H04L 67/306 |
| 11,042,417 | B2* | 6/2021 | Yousaf | G06F 9/542 |
| 11,063,993 | B2* | 7/2021 | Arauz-Rosado | H04L 61/5007 |
| 11,093,296 | B2* | 8/2021 | Yoshimura | G06F 9/45558 |
| 11,317,316 | B2* | 4/2022 | Nakano | H04W 28/0268 |
| 11,340,943 | B2* | 5/2022 | Morper | G06F 9/5005 |
| 11,740,924 | B2* | 8/2023 | Cook | H04B 10/27 709/216 |
| 11,757,790 | B2* | 9/2023 | Kim | H04L 43/0876 |
| 12,212,457 | B2* | 1/2025 | Blau | H04L 41/0806 |
| 12,294,886 | B2* | 5/2025 | Nakano | H04L 45/64 |
| 2016/0330140 | A1* | 11/2016 | Cook | H04L 67/02 |
| 2016/0330613 | A1* | 11/2016 | Cook | G06F 9/45558 |
| 2016/0337206 | A1* | 11/2016 | Bugenhagen | H04L 41/0816 |
| 2017/0222889 | A1* | 8/2017 | Zong | H04L 41/5051 |
| 2017/0288971 | A1* | 10/2017 | Jayaraman | H04L 41/5051 |
| 2017/0308395 | A1* | 10/2017 | Cook | H04L 12/66 |
| 2017/0329639 | A1* | 11/2017 | Morper | G06F 9/45558 |
| 2018/0070262 | A1* | 3/2018 | Nakano | H04L 41/40 |
| 2018/0248973 | A1* | 8/2018 | Cook | H04L 63/08 |
| 2018/0253332 | A1* | 9/2018 | Andrianov | H04L 41/40 |
| 2018/0316730 | A1* | 11/2018 | Schaefer | H04L 41/28 |
| 2019/0065234 | A1* | 2/2019 | Zembutsu | H04L 47/82 |
| 2019/0171492 | A1* | 6/2019 | Yousaf | G06F 9/5061 |
| 2019/0199760 | A1* | 6/2019 | Arauz-Rosado | H04L 61/5007 |
| 2021/0191743 | A1* | 6/2021 | Nishigori | G06F 9/45558 |
| 2022/0231908 | A1* | 7/2022 | Blau | H04L 41/122 |
| 2022/0329539 | A1* | 10/2022 | Kim | H04L 41/147 |
| 2022/0337679 | A1* | 10/2022 | Cook | H04L 67/12 |

FOREIGN PATENT DOCUMENTS

| | | |
|---|---|---|
| KR | 10-2018-0080791 A | 7/2018 |
| KR | 10-2021-0060364 A | 5/2021 |

OTHER PUBLICATIONS

Written Opinion of the International Searching Authoriity of PCT/KR2022/007460, dated Mar. 24, 2023.

* cited by examiner

NFV INFRASTRUCTURE SYSTEM BASED ON EXTENDED CONTAINER INFRASTRUCTURE

CROSS-REFERENCE TO RELATED APPLICATION

This application is a continuation of pending PCT International Application No. PCT/KR2022/007460, which was filed on May 25, 2022, and which claims priority to Korean Patent Application No. 10-2021-0187075 which was filed in the Korean Intellectual Property Office on Dec. 24, 2021, and Korean Patent Application No. 10-2022-0020729 which was filed in the Korean Intellectual Property Office on Feb. 17, 2022. The disclosures of which are hereby incorporated by reference in their entireties.

TECHNICAL FIELD

The present disclosure relates to an NFV infrastructure system based on an extended container infrastructure, which is capable of accommodating a VM infrastructure.

BACKGROUND ART

As communication services have been rapidly developed, traffic volume, which means the amount of data transmission, is rapidly increasing. At the same time, a traffic pattern is also changing from a pattern in which a server and a user simply send and receive to a complex pattern such as accessing the database of other servers.

In order to solve limitations of such a physical infrastructure, a network function virtualization (NFV) framework is introduced, which can separate a software network function from a physical network device to generate multiple simulation environments or dedicated resources in a single physical hardware system.

Since an NFV infrastructure is capable of extending or reducing resources as many as desired in a right place without any more being constrained by a physical resource limitation by separating software and hardware, the NFV infrastructure has an advantage of keeping high flexibility when configuring physical network equipment.

FIG. 1 is a diagram illustrating a conventional NFV infrastructure system.

An NFV infrastructure may have a virtualization infrastructure based on a virtual machine (VM), a virtualization infrastructure based on a container, or an infrastructure structure in which a VM infrastructure and a container infrastructure are mixed. Further, the NFV infrastructure communicates with the VM infrastructure or the container infrastructure through a management and network orchestration (MANO) system, and distributes a virtual network function (VNF) or a network service (NS) which is an individual network function to virtualized infrastructure managers (VIMs) connected to the MANO system.

In this case, when a resource model requested by an administrator and a resource model used in each infrastructure are different, the MANO system converts the resource model into a resource model which is comprehensible in the corresponding infrastructure, and distributes the VNF or NS.

Further, in the respective infrastructures, a driving scheme may be different for each infrastructure, and a used resource model may also be different. Referring to FIG. 1, the resource models used in the VM infrastructure and the container infrastructure are different from each other as resource model A, resource model B, and resource model C, and the resource model used in each infrastructure may be different from the resource model requested by the administrator.

Accordingly, when a plurality of VM infrastructures or container infrastructures are simultaneously mixed and used in the conventional NFV infrastructure system, descriptors of different resource models are used, so there is a difficulty for an interaction of an internal network, and there is a problem in that it is difficult to synchronize the MANO system and all infrastructures.

Further, when multiple infrastructures are mixed and used in the conventional NFV infrastructure system, a separate communication model is required for each infrastructure, so there is a problem in that the complexity of a whole NFV infrastructure system increases according to the addition of infrastructure.

DISCLOSURE

Technical Problem

An object of the present disclosure is to provide an NFV infrastructure system which includes a MANO system in an extended container infrastructure to remarkably reduce the complexity of an NFV infrastructure apparatus according to the addition of infrastructure.

Further, an object of the present disclosure is to provide an NFV infrastructure system in which an administrator may easily manage an NFV infrastructure even without knowledge of all resource models used in respective infrastructures by using a unified resource model.

The objects of the present disclosure are not limited to the above-mentioned objects, and other objects and advantages of the present disclosure that are not mentioned can be understood by the following description, and will be more clearly understood by the embodiments of the present disclosure. Further, it will be readily appreciated that the objects and advantages of the present disclosure can be realized by means and combinations shown in the claims.

Technical Solution

An NFV infrastructure system based on a container infrastructure according to an embodiment of the present disclosure includes a master node configured to distribute and manage a virtual network function (VNF) which is an individual network function according to a request by an administrator; and a worker node of an extended container infrastructure structure which allocates the distributed VNF to a VM based infrastructure or a container based infrastructure, wherein a resource model between the master node and the worker node is a resource model which is the same as a resource model according to the request by the administrator.

Further, in an embodiment of the present disclosure, the VNF includes at least one pod which is a minimum distribution unit, and the pod is a VM based pod or a container based pod.

In addition, in an embodiment of the present disclosure, the resource model according to the request by the administrator is a resource model based on an NFV-SOL standard defined in the European Telecommunications Standards Institute (ETSI).

Further, in an embodiment of the present disclosure, the master node includes a MANO system generating the VNF, communicating with the worker node and managing the VNF, and an API server including a plurality of APIs and distributing the VNF to the worker node.

Further, in an embodiment of the present disclosure, the MANO system includes a VNF controller generating the VNF or managing the generated VNF, and an SFC controller configuring a path of an internal network and controlling the traffic of the internal network.

In addition, in an embodiment of the present disclosure, the VNF controller links a resource of the VNF generated for monitoring and updating the plurality of infrastructures to a resource of each of the plurality of infrastructures.

Further, in an embodiment of the present disclosure, the worker node includes a plurality of infrastructures to which the VNF is allocated, Kublelet managing the plurality of infrastructures through communication between the master node and the worker node and allocating the VNF to the plurality of infrastructures, and a container runtime executing the VNF in the worker node.

Further, in an embodiment of the present disclosure, the distributed VNF includes generation and management information for an infrastructure such as a computing resource, a network resource, endpoint information, disk information, etc.

Advantageous Effects

The NFV infrastructure system according to an embodiment of the present disclosure includes a MANO system in an extended container infrastructure, thereby remarkably reducing the complexity of an NFV infrastructure apparatus according to infrastructure addition.

Further, in the NFV infrastructure system according to an embodiment of the present disclosure, an administrator may easily manage an NFV infrastructure without knowledge of all resource models used in respective infrastructures by using a unified resource model.

BEST MODEL

Figure 1:
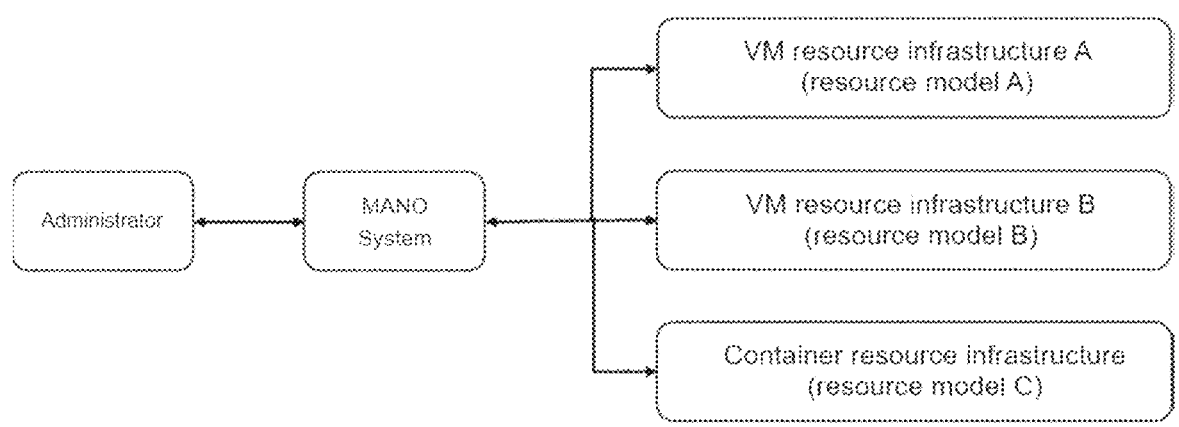
FIG. 1 is a diagram illustrating a conventional infrastructure system.

The present disclosure may be variously modified and have several embodiments, and thus, specific embodiments will be illustrated in the drawings and described in detail in the detailed description. However, it is to be understood that the present disclosure is not limited to a specific embodiment, but includes all modifications, equivalents, and substitutions included within the idea and technical scope of the present disclosure. In describing each drawing, like reference numerals are used for like components.

The terms such as first, second, A, and B may be used to describe various components, but the components should not be limited by the terms. The terms are used only for the purpose of distinguishing one component from another component. For example, a first component may be referred to as a second component, and similarly, the second component may also be referred to as the first component without departing from the scope of the present disclosure. The term 'and/or' includes a combination of a plurality of related items as described or any of a plurality of related items as described.

When it is described that a component is "connected to" or "accesses" another component, it should be understood that the component may be directly connected to or access the other component, but that another component may be present therebetween. In contrast, when it is described that a component is "directly connected to" or "directly accesses" another component, it is to be understood that no other component is present therebetween.

The terms used herein are used only to describe specific embodiments, and are not intended to limit the present disclosure. A singular form includes a plural form unless the context clearly dictates otherwise. It is to be understood that the term "comprise" or "have" as used in the present specification is intended to designate the presence of stated features, numbers, steps, operations, components, parts or combinations thereof, but not to preclude the possibility of the presence or addition of one or more other features, numbers, steps, operations, components, parts, or combinations thereof.

Unless otherwise defined, all terms used herein including technical or scientific terms have the same meanings as those commonly understood by a person with ordinary skill in the technical field to which the present disclosure pertains. The terms defined in commonly used dictionaries should be interpreted as having a meaning consistent with the meaning in the context of the related art, and are not interpreted as an ideal or excessively formal meaning unless explicitly defined in the present application.

Hereinafter, a preferred embodiment of the present disclosure will be described in detail with reference to the accompanying drawings.

Figure 2:
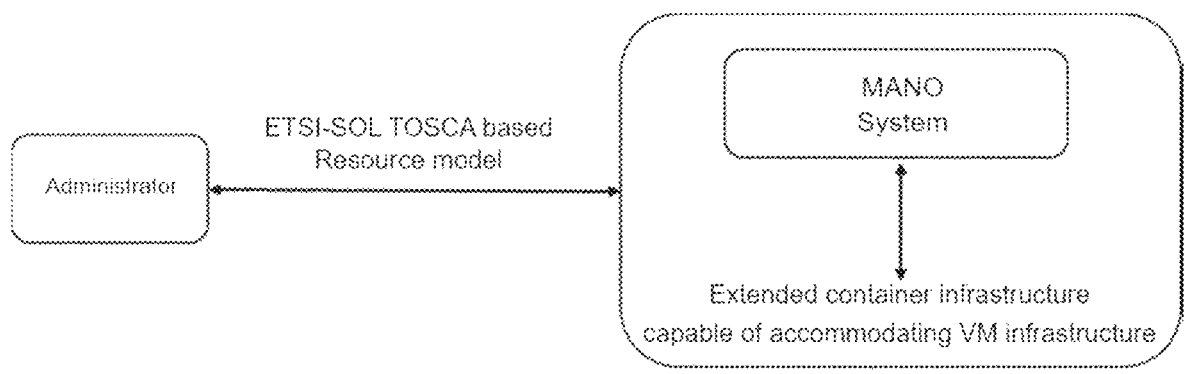
FIG. 2 is a conceptual view between an NFV infrastructure system and an administrator according to an embodiment of the present disclosure.
Figure 3:
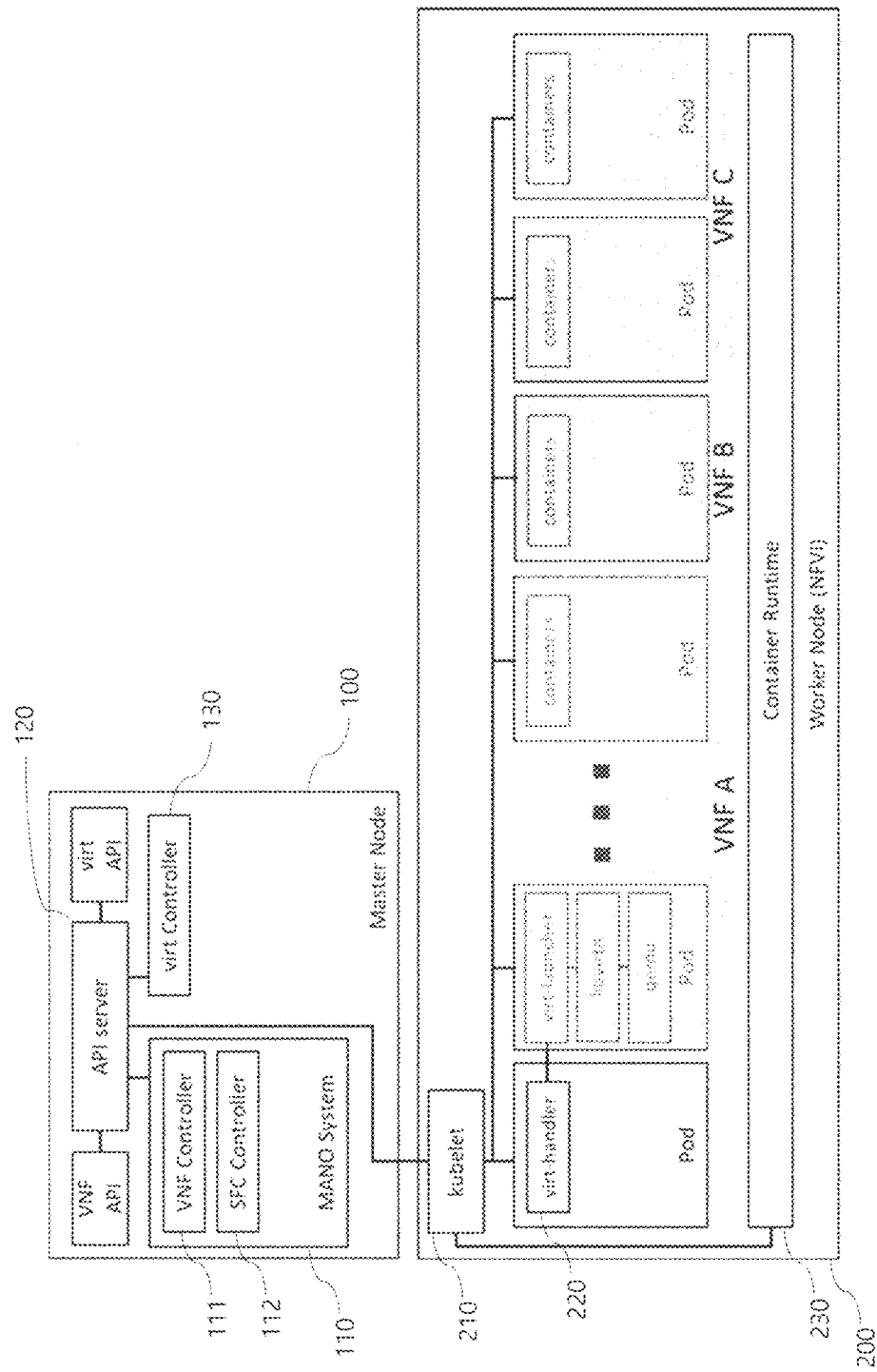
FIG. 3 is an internal configuration diagram of the NFV infrastructure system according to an embodiment of the present disclosure.

FIG. 2 is a conceptual view between an NFV infrastructure system and an administrator according to an embodiment of the present disclosure, and FIG. 3 is an internal configuration diagram of the NFV infrastructure system according to an embodiment of the present disclosure.

Referring to FIGS. 2 and 3, the NFV infrastructure system of the present disclosure is a system that controls a network function through software executed in a computing node by virtualizing the network function, and includes a master node 100 and a worker node 200.

The master node 100 distributes and manages a virtual network function (VNF) or a network service (NS) which is an individual network function according to a request by an administrator. Hereinafter, for convenience of description, it will be limitingly described that the master node 100 distributes and manages the VNF.

Specifically, the master node 100 includes a Management And Network Orchestration (MANO) system 110, an API server 120, and a virt controller 130 therein.

The MANO system 110 communicates with the worker node 200 through the API server 120, and takes charges of generation, management, and orchestration of the VNF, and traffic control of a whole network, and performs a function by using a VNF controller 111 and an SFC controller 112 therein unlike a case where the conventional MANO system is constituted by a Virtualized Infrastructure Manager (VIM), a VNF Manager (VNFM), an NFV Orchestrator (VNFO), etc.

Specifically, the VNF controller 111 that is charge for generating and managing the VNF, and recognizes a descriptor of a VNF resource model according to the request by the manager to generate the VNF to operate in the worker node 200. Accordingly, a resource model between the master node 100 and the worker node 200 may be the same as a resource model according to the request by the administrator, and the resource model according to the request by the administrator may be a resource mode based on an NFV-SOL standard defined in the European Telecommunications Standards Institute (ETSI).

Further, the SFC controller 112 configures a path of a whole network or controls traffic of the whole network. That is, a service function changing (SFC) function is implemented. A VNF generation process by the VNF controller 111 will be described below in detail.

The API server 120 includes a plurality of APIs, and distributes the VNF generated by the VNF controller 111 to the worker node 200. At this time, the plurality of APIs may be a VNF API or virt API receiving the VNF request of the administrator, and the distributed VNF may include generation and management information for an infrastructure resource such as a computing resource, a network resource, endpoint information, and disk information.

In the present disclosure, since the API server 120 distributes the VNF to the worker node 200 from the master node 100 by using one unified communication module, a separation communication module according to an individual infrastructure or provider is not required, and a resource model which is the same as the resource model according to the request by the administrator is used, thereby remarkably reducing the complexity of the network.

The virt controller 130 is a controller of a 3rd party library that controls the VM resource, which communicates with the API server 120 inside the master node 100, and controls an operation of a virt handler 220 of the worker node 200 to be described below.

The worker node 200 is an extended container infrastructure structure, which allocates the distributed VNF to a plurality of infrastructures. Here, the plurality of infrastructures may be a VM based infrastructure or a container based infrastructure.

That is, in the present disclosure, the worker node 200 may be an extended container infrastructure based NFV infrastructure (NFVI) which may accommodate the VM resource, and includes the VM based infrastructure inside the worker node 200 to manage both the container resource and the VM resource.

Further, the worker node 200 includes Kublelet 210, the virt handler 220, a container runtime 230, and a plurality of infrastructures to which the VNF is allocated.

The VNF allocated to the infrastructure may be configured by a set of pods as a minimum distribution unit. That is, the VNF may include at least one pod in the infrastructure, and the pod which is the computing resource may be a VM based pod or a container based pod.

The Kubelet 210 is a node agent that is responsible for communication between the master node 100 and the worker node 200, which allocates the VNF to the infrastructure through an orchestration function, and manages the infrastructure by periodically checking a state of the infrastructure in the worker node 200.

The virt handler 220 is a 3rd party object that manages the infrastructure, and the container runtime 230 directly executes the VNF distributed by the worker node 200. The container runtime 230 may be, for example, a docker, but is not particularly limited thereto.

As described above, the container infrastructure based NFV infrastructure system of the present disclosure may recognize the descriptor of the resource model according to the request by the administrator as the MANO system 110 is present not outside but inside the NFV infrastructure system, and may use the resource model which is the same as the resource model according to the request by the administrator.

Further, the container infrastructure based NFV infrastructure system generates the VNF by using the same resource model as described above, so the MANO system and the plurality of infrastructures inside the worker node 200 may easily recognize the VNF distributed on the same line.

Further, since the container infrastructure based NFV infrastructure system uses the same resource model, knowledge of the resource model of each infrastructure is not required, and when the administrator intends to update or change the infrastructure, the container infrastructure based NFV infrastructure system is capable of directly updating or changing the infrastructure without going through a conversion process through the MANO system.

Figure 4:
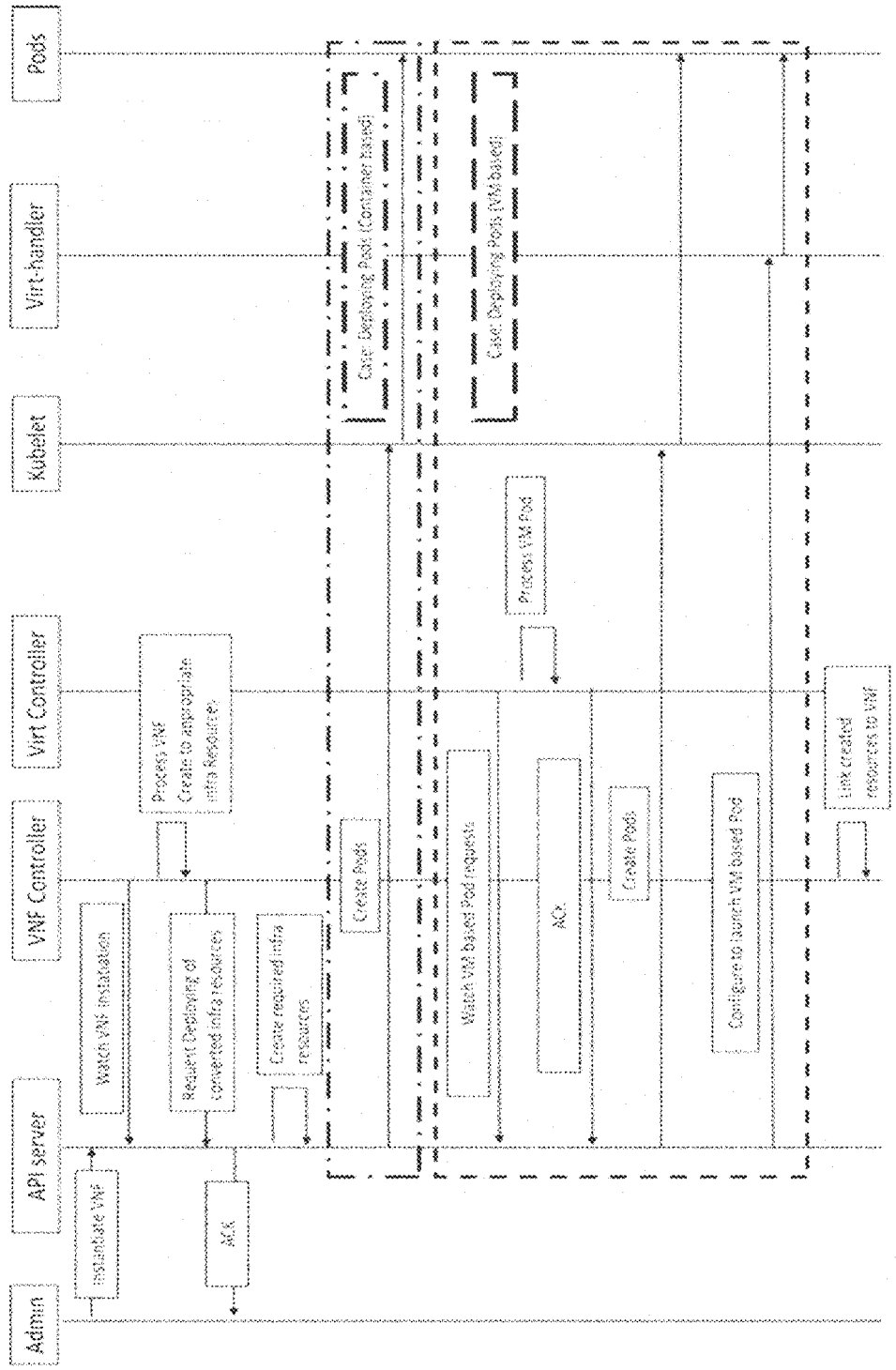
FIG. 4 is a flowchart illustrating a VNF generation and distribution process in an embodiment of the present disclosure.

FIG. 4 is a flowchart illustrating a VNF generation and distribution process in an embodiment of the present disclosure.

When an administer requests generation of a VNF to an API server, a VNF controller detects a descriptor of a resource model according to a request. Thereafter, the VNF controller responds to the administrator by generating a VNF including at least one pod, and at the same time, distributes the VNF to a plurality of infrastructures of a worker node 200 through Kublelet. At this time, a VM based pod is distributed to a VM based infrastructure and a container based pod is distributed to a container based infrastructure.

In an embodiment, the VNF controller may link a resource of the VNF generated for monitoring and updating a plurality of infrastructures to a resource of each of the plurality of infrastructures. Accordingly, when the NFV infrastructure system of the present disclosure is used, the administrator may monitor a resource of a desired individual infrastructure, and easily manage the resource only through the VNF resource.

Hereinabove, although the present disclosure has been described with reference to illustrative drawings, the present disclosure is not limited to the embodiments and drawings disclosed in this specification, and it is apparent that various modifications may be made by those skilled in the art within the scope of the technical idea of the present disclosure. Moreover, even if the operational effect according to the configuration of the present disclosure was not explicitly disclosed and described while describing the embodiments of the present disclosure above, it is natural that an effect predictable by the corresponding configuration should also be recognized.

The invention claimed is:

1. An NFV infrastructure system based on a container infrastructure, comprising:
    a master node configured to distribute and manage a virtual network function (VNF) which is an individual network function according to a request by an administrator; and
    a worker node of an extended container infrastructure structure which allocates the distributed VNF to a VM based infrastructure or a container based infrastructure,
    wherein a resource model between the master node and the worker node is a resource model which is the same as a resource model according to the request by the administrator.

2. The NFV infrastructure system based on a container infrastructure of claim 1, wherein the VNF includes at least one pod which is a minimum distribution unit, and the pod is a VM based pod or a container based pod.

3. The NFV infrastructure system based on a container infrastructure of claim 1, wherein the resource model according to the request by the administrator is a resource model based on an NFV-SOL standard defined in the European Telecommunications Standards Institute (ETSI).

4. The NFV infrastructure system based on a container infrastructure of claim 1, wherein the master node includes a MANO system generating the VNF and controlling traffic of a whole network; and an API server including a plurality of APIs, and distributing the VNF to the worker node.

5. The NFV infrastructure system based on a container infrastructure of claim 4, wherein the MANO system includes a VNF controller generating the VNF or managing the generated VNF; and an SFC controller configuring a path of the whole network and controlling the traffic of the whole network.

6. The NFV infrastructure system based on a container infrastructure of claim 5, wherein the VNF controller links a resource of the VNF generated for monitoring and updating the plurality of infrastructures to a resource of each of the plurality of infrastructures.

7. The NFV infrastructure system based on a container infrastructure of claim 1, wherein the worker node includes a plurality of infrastructures to which the VNF is allocated; Kublelet managing the plurality of infrastructures through communication between the master node and the worker node, and allocating the VNF to the plurality of infrastructures; and a container runtime executing the VNF in the worker node.

8. The NFV infrastructure system based on a container infrastructure of claim 1, wherein the distributed VNF includes generation and management information for an infrastructure such as a computing resource, a network resource, endpoint information, and disk information.

* * * * *